B. H. CRESSMAN.
APPLE CORER.
APPLICATION FILED JAN. 11, 1908.
953,194.
Patented Mar. 29, 1910.
Fig. 1.
Fig. 2.
Fig. 3.
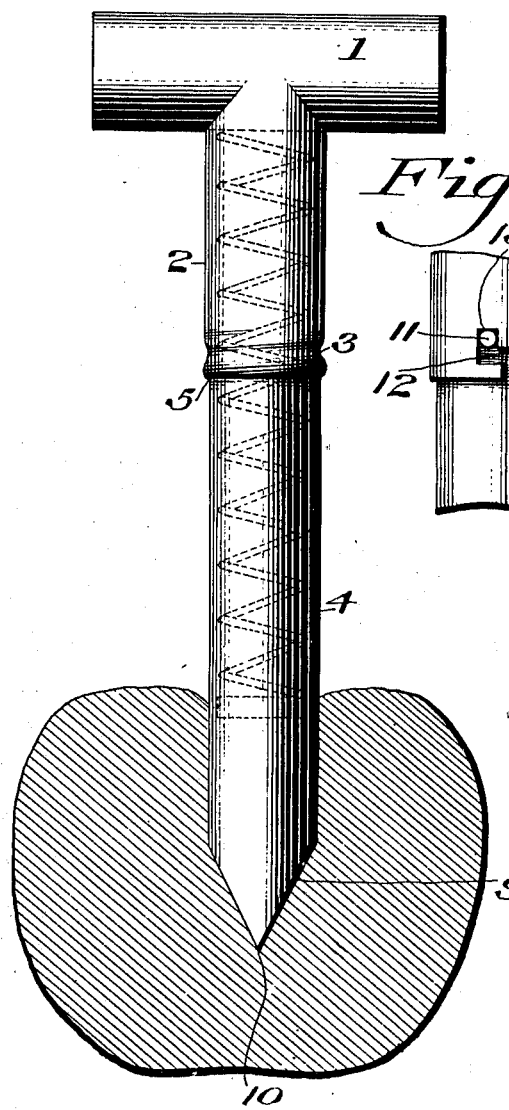
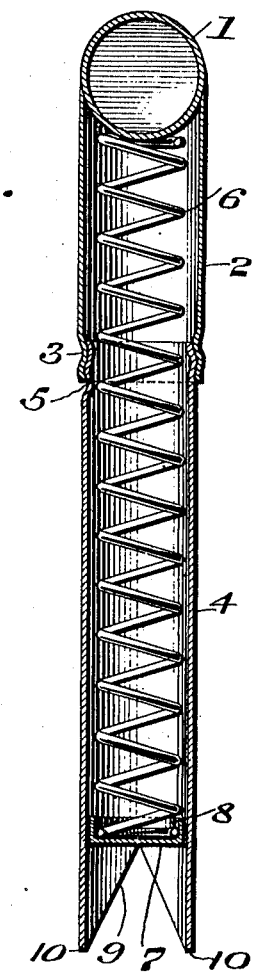
Witnesses
P. F. Nagle.
L. Douville.
Inventor
Beryl H. Cressman.
By Wiedersheim & Fairbanks.
Attorneys

UNITED STATES PATENT OFFICE.

BERYL H. CRESSMAN, OF PHILADELPHIA, PENNSYLVANIA.

APPLE-CORER.

953,194. Specification of Letters Patent. Patented Mar. 29, 1910.

Application filed January 11, 1908. Serial No. 410,343.

*To all whom it may concern:*

Be it known that I, BERYL H. CRESSMAN, a citizen of the United States, residing in the city and county of Philadelphia, State of Pennsylvania, have invented a new and useful Improvement in Apple-Corers, of which the following is a specification.

My invention relates to a new and useful apple corer and consists in providing means for automatically discharging the core from the device.

It further consists in providing a separable stem with means for attaching the parts together.

It further consists in other novel details of construction, all as will be hereinafter fully set forth and claimed.

Figure 1 represents a side elevation of an apple corer embodying my invention showing the apple in section. Fig. 2 represents a vertical sectional view of the corer. Fig. 3 represents a side elevation of a portion of a device showing a different means for securing the parts of the stem together.

Similar numerals of reference indicate corresponding parts in the figures.

Referring to the drawings: 1 designates the handle of the apple corer and integral therewith or secured thereto is one section or portion 2 of the stem, the same being hollow and having the threads 3 thereon.

4 designates the removable section or portion of the stem provided with the threads 5 which are adapted to engage with the threads 3 on the portion 2 in order to lock the two sections together. Secured to a suitable point on the interior of the corer, in the present instance, to the handle 1 is a coiled spring 6 upon the end of which is secured a follower or plunger 7 which in the present instance is provided with the upturned flange 8 within which the lower end of the spring 6 is seated and secured, this being accomplished in any desired manner.

The lower or operating end of the section 4 is provided with the cut away V portion 9 forming the points 10 for piercing the apple or other fruit.

The operation of the device will be readily apparent: The points 10 are forced into the apple or fruit and the core is forced into the section 4 of the stem, compressing the spring 6. As soon as the corer is removed from the apple the spring forces out the core as will be evident. By removing the section 4 the parts can be thoroughly washed and access to the interior may be had.

In the construction shown in Fig. 3 in lieu of the threads 3 and 5 I provide a bayonet joint as shown in the pin 11 secured to the section 4 and the slot 12 having the offset recess 13 for the reception of the pin 11 so that the parts cannot be accidentally separated.

Having thus described my invention, what I claim as new and desire to secure by Letters Patent, is:

As an improved article of manufacture, an apple corer consisting solely of a tubular member having a cross member at one end forming a handle, a cylinder detachably yet firmly held to the other end of said tubular member and having V-shaped openings at its outer end, a spring extending lengthwise of and within said tubular member and cylinder and abutting at its inner end against said cross member, and a follower in said cylinder and having an upturned flange, said spring having a bearing within said upturned flange and against said follower and the latter at all times confined within said cylinder.

BERYL H. CRESSMAN.

Witnesses:
 CHARLES H. WEISS,
 IDA J. BLACK.